United States Patent [19]

Yamamoto et al.

[11] Patent Number: 4,613,555

[45] Date of Patent: Sep. 23, 1986

[54] IMAGE FORMING METHOD USING ELECTRICALLY CONDUCTIVE, LIGHT TRANSMISSIVE PARTICLES

[75] Inventors: Hajime Yamamoto, Hirakata; Hiromu Matsuda, Katano; Keiichi Yubakami, Suita; Yuji Takashima, Nishinomiya, all of Japan

[73] Assignee: Matsushita Electric Industrial Co., Ltd., Osaka, Japan

[21] Appl. No.: 762,149

[22] PCT Filed: Nov. 22, 1984

[86] PCT No.: PCT/JP84/00560

§ 371 Date: Jul. 22, 1985

§ 102(e) Date: Jul. 22, 1985

[87] PCT Pub. No.: WO85/02470

PCT Pub. Date: Jun. 6, 1985

[30] Foreign Application Priority Data

Nov. 30, 1983 [JP] Japan ................ 58-225921

[51] Int. Cl.[4] ............... G03G 13/01; G03G 13/22
[52] U.S. Cl. ........................... 430/45; 430/31; 430/42
[58] Field of Search ............... 430/31, 42, 45

[56] References Cited

U.S. PATENT DOCUMENTS

| 3,898,082 | 8/1975 | Giaimo | 430/42 |
| 3,998,634 | 12/1976 | Iwasa | 430/31 X |
| 4,075,011 | 2/1978 | Iwasa et al. | 430/31 X |
| 4,145,300 | 3/1979 | Hendricks | 252/62.53 X |
| 4,230,784 | 10/1980 | Nishiguchi et al. | 430/42 |
| 4,284,696 | 8/1981 | Ishida et al. | 430/42 |

Primary Examiner—Roland E. Martin
Attorney, Agent, or Firm—Stevens, Davis, Miller & Mosher

[57] ABSTRACT

In an image forming method including the steps of electrostatically adhering light-transmissive particles onto the surface of a photoconductive substrate, exposing an image on the particles, and developing the image by separating the particles through which no light is transmitted from the particles through which light is transmitted in order to obtain a particle image consisting of one of the particle groups, the step of equalizing the potentials of the particles through which light is transmitted and those of the particles through which no light is transmitted is inserted between the exposure step and the development step. This additional step eliminates the defect in the conventional method in which degradation of color purity occurs at a thick color portion.

7 Claims, 5 Drawing Figures

IMAGE FORMING METHOD USING ELECTRICALLY CONDUCTIVE, LIGHT TRANSMISSIVE PARTICLES

FIELD OF THE INVENTION

The present invention relates to an image forming method applied to copying machines and printers, and particularly to an image forming method utilizing light-transmissive particles.

BACKGROUND OF THE INVENTION

U.S. Pat. No. 4,294,902 discloses a typical example of such an image forming method utilizing light-transmissive particles. The principle of the method will be roughly explained in the following. After electrostatic adhesion of light-transmissive particles onto a photoconductive substrate, when an image is exposed, the electrostatic attraction force between the light-transmissive particles and the substrate is weakened or lost. Accordingly, the difference in electrostatic attraction force between the light-transmissive particles through which light is transmitted and the particles through which no light is transmitted, is utilized for development, whereby a particle image can be obtained.

By this method a full-color image can be obtained through one-time exposure and one-time development. Further, if sublimable color-formers used as image coloring materials are carried by particles, and are sublimated after development onto an image receiving sheet, color-mixing can be effected in their molecular states, and therefore, color-images which are excellent in color-reproducibility can be obtained.

The above-described method, however, produces the following problems.

As is shown in FIG. 1, light-transmissive particles 1 are first spread onto a charged photoconductive substrate 2. The particles 1, which are electroconductive, are electrostatically induced and adhered to the surface of the substrate 2. Ordinarily only one particle layer is formed in order to allow its color separation function to be fully exhibited. Since the light-transmissive particle is spherical or amorphous, gaps are formed among the particles even in the closest packing. In the case of one-layer particles, the covering rate of the particles in relation to the substrate surface is ordinarily 70 to 80%. The gap between the particles becomes a component of electrostatic capacity and is a cause for degradation of color separation ability in the later development stage.

On the electroconductive particles sprayed into one layer opposite charges are stored, the amount of which is large enough to cancel the charges on the entire surface of the charged substrate, or larger, depending on the method of formation of the layer. For example, if a sensitized plate of zinc oxide which is charged to $-400$ V is used as the substrate 2, the electric potential of the particles after they are formed into one layer is $0 \sim +100$ V.

An image is next exposed, as is shown in FIG. 2. The reference numeral 1a represents a particle through which no light is transmitted, and 1b a particle through which light is transmitted. Since the substrate portions under the particles through which light is transmitted becomes electroconductive, the charges of the particles escape to the earth, whereby the electric potential of the particles is lowered to approximately 0 V. However, with respect to the particles through which no light is transmitted, the charges are only lost at the substrate portions which are not shaded by the particles, while the portions under the particles are insulated with the charges held. Accordingly the electrostatic capacity between the particles and the substrate becomes smaller than before the exposure (FIG. 2). Since the amount of the charges of the particles at this time is the same as that before the exposure, the potential of the particles through which no light is transmitted rises, as is obvious from the formula $Q=CV$.

As is described above, since the electrostatic capacity components also exist between the particles on the substrate, if a difference in potential arouses between the particles 1a and 1b, charges are induced into the particles 1b, whereby a new electrostatic attractive force is generated between the particles 1a and 1b. In order to remove only those particles 1b which are in this state, much force is required and particularly at the portions where the color density is thick, namely at the portions which have many particles 1a through which no light is transmitted, it is difficult to remove the particles 1b through which light is transmitted. In this way, the conventional method of developing immediately after exposure is defective in that color purity is lowered at the portions where color density is thick.

SUMMARY OF THE INVENTION

Accordingly, it is an object of the invention to eliminate the above-described defect in the conventional method, and to provide a novel image forming method. In order words, it is an object of the invention to provide an image forming method which enables easy removal of the particles through which light is transmitted and whose electrostatic attractive force is weakened in relation to a photoconductive substrate.

This invention is characterized in that in an image forming method including the steps of electrostatically adhering light-transmissive particles onto the surface of a photoconductive substrate, exposing an image on the particles, and developing the image by separating the particle group consisting of the particles through which no light is transmitted from the particle group consisting of particles through which light is transmitted in order to obtain a particle image consisting of one of the particle groups, the step of equalizing the potentials of the particles through which light is transmitted and those of the particles through which no light is transmitted is added between the exposure step and the development step.

In order to obtain a color image, it is necessary to provide light-transmissive particles with a spectral function and a developing function for developing the color in correspondence with the color separating function. Accordingly, particles are used consisting of a mixture of two or more light-transmissive particles containing a color material which transmits one color selected from the three primary colors of the additive color process and which develops the complementary additive color of the above-described one color by utilizing a color selected from the three primary colors of the subtractive color process.

For the purpose of making the particle image obtained on the photoconductive substrate a permanent visible image, it is preferably fixed onto an image receptor by transferring it onto the image receptor. As a fixing method there is a method of fixing the particle image onto an image receptor by virtue of the heat fusion of the particles by dissolving the particles with a solvent or heating them. When the particles contain a sublimable color dye, it is possible to produce on the image receptor a colored image consisting of the color dye by heating the particle image. When the particles contain a sublimable color former it is possible to produce a colored image by the color former on the image receptor by infiltrating the developer of the sublimable color former into the image receptor and reacting the color former with the developer by heating.

Light-transmissive particles used for this invention which are to be mentioned are transparent particles, such as polymethyl methacrylate and glass bead with their surfaces colored by a coloring agent, and a resin of good transparency such as an acryl resin, a styrene resin, a styrene butadiene copolymer, polyvinyl alcohol with a coloring agent dispersed therein.

The coloring agent of the light-transmissive particles effective for this invention may be replaced by or be used in combination with a dispersed color former which reacts with an electron receptive material such as bisphenol A and active clay, for example, a triazine dye or a stilbene dye. The shape of this kind of light-transmissive particle is preferably spherical and the particle diameter is preferably several to 80 microns.

As a sensitized substrate containing a photoconductive material is used an electroconductive substrate such as a metal plate, metallized paper, metallized film, or paper which is subjected to electroconductive treatment, and on such a substrate a photoconductive material such as selenium, zinc oxide, cadmium sulfide, titanium oxide, amorphous silicone, poly-N-vinylcarbazole, or polyvinyl anthracene is deposited or coated. A sensitized photoconductive material which is sensitized and panchromatized by an ordinary method is used for color reproduction.

The structure of the light-transmissive particles and a basic process for obtaining a color image described above are explained in detail in U.S. Pat. Nos. 4,230,784 and 4,294,902.

DESCRIPTION OF THE PREFERRED EMBODIMENT

This invention will next be described in detail with reference to the accompanying drawings.

FIGS. 1 to 4 show the principle of an image forming method according to the invention.

Figure 1:
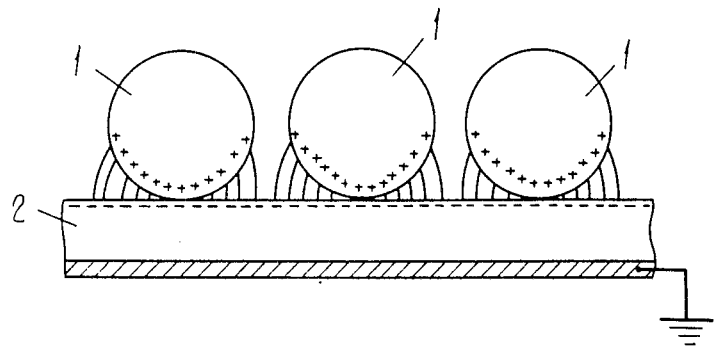
FIG. 1 shows electroconductive light-transmissive particles which are electrostatically adhered onto an charged sensitized substrate.

As is shown in FIG. 1, a sensitized substrate 2 of zinc oxide is charged to $-400$ V and electroconductive light-transmissive particles 1 are adhered to the substrate 2 into one layer. The covering rate of the particles in relation to the surface of the charged substrate is about 70%, and the potential of the particles is $+80$ V.

When an image is exposed from the particle surface (FIG. 2), the particle 1a does not transmit light and leaves the charges on the charged plate 2, but the particles 1b transmits light and the charges on the charged substrate 2 are lost. Though the amount of the charges of the particles 1a is the same as that before the exposure, the electrostatic capacity between the particles 1a and the substrate 2 becomes smaller than that before the exposure shown in FIG. 1, whereby the potential of the particles 1a rises. The potential of the particles 1a after the exposure is actually measured to be $+110$ V.

Figure 2:
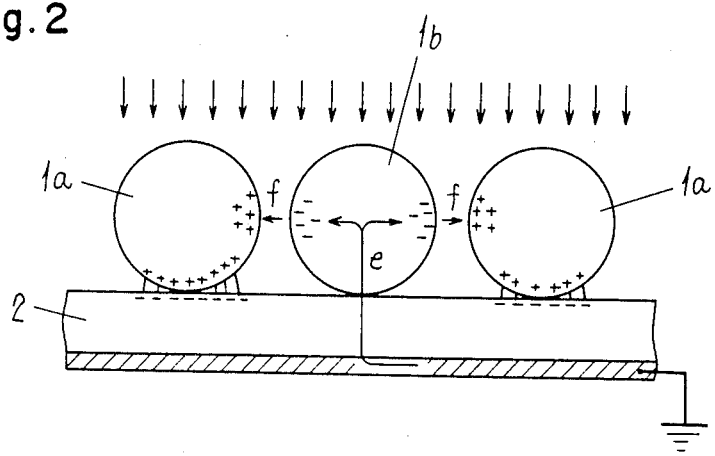
FIG. 2 is an explanatory view of the correlative force between the particles through which light is transmitted and the particles through which no light is transmitted after image exposure.

In the state shown in FIG. 2, opposite charges are induced to the particles 1b through the substrate 2 by virtue of excessive charges within the particles 1a, new electrostatic attractive forces f were generated between the particles 1a and 1b. It is difficult to remove the particles 1b by adding vibration to the substrate 2 if many particles 1a having excessive charges exist around the particles 1b.

Figure 3:
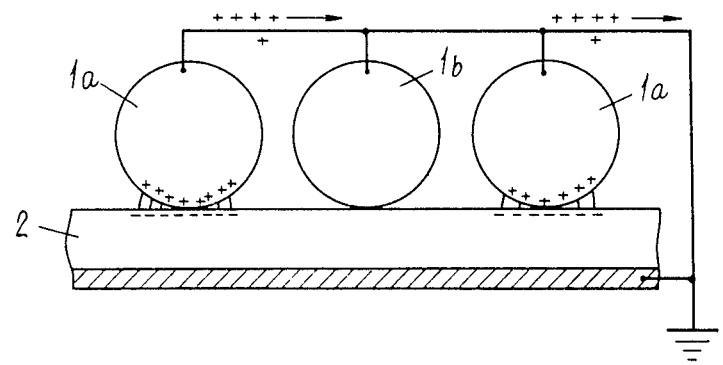
FIG. 3 explains that discharge of the particle surface after exposure extinguishes the correlative force between the particles.
Figure 4:
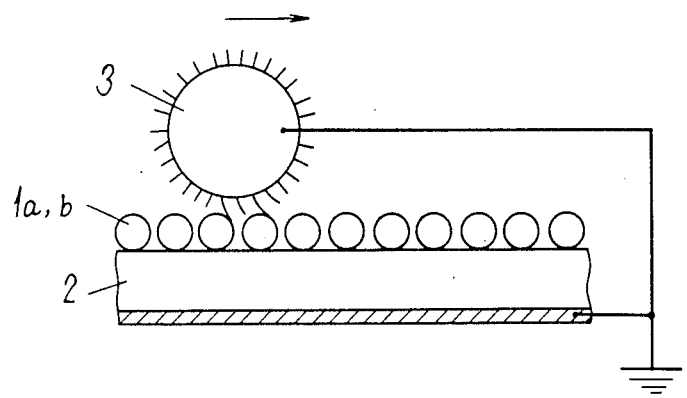
FIG. 4 shows an embodiment of an image forming method according to the invention.

If the excessive charges within the particles 1a are caused to escape to the earth at this time, as is shown in FIG. 3, the electrostatic attractive forces between the particles 1a and 1b become extinguished. Theoretically it is unnecessary to lower the potential of the particles to 0 V and it should be sufficient to make the particles 1a and 1b equipotential, but in fact it is the easier to lower the potential to 0 V. In order to earth the particle 1a and 1b, the particle surfaces after exposure are rubbed with an earthed electroconductive brush which is shown in FIG. 4.

Figure 5:
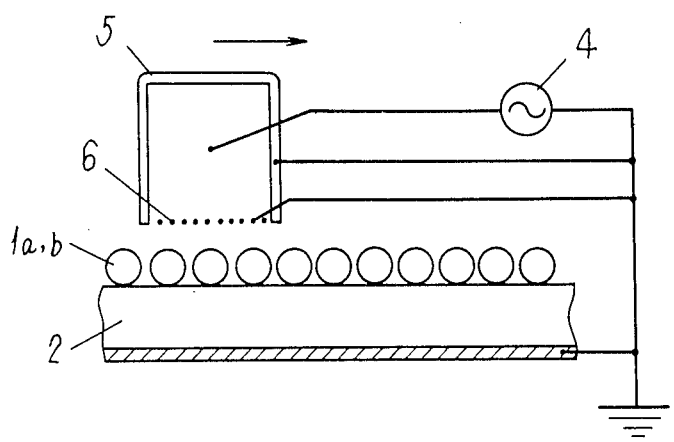
FIG. 5 shows another embodiment of an image forming method according to the invention.

More preferably, the surfaces of the particles were discharged by an alternating corona current such as shown in FIG. 5. The referential numeral 4 denotes an alternative high voltage power source, 5 a scorotron charger, and 6 a grid electrode. This method enables discharge the excessive charges without distributing a particle image and cançellation of the correlative forces between the particles. When the surface of the substrate after discharge is subjected to vibration in this way, a particle image having high color purity even at a portion where color density is thick is obtained.

An example will be explained in the following.

Red, green and blue-violet solutions were prepared in accordance with the following formulation.

| | Part by weight |
|---|---|
| (1) Red solution | |
| SBR resin binder: Naugatex 2752 (Manufactured by Sumitomo-Naugatak Co., Ltd.) | 100 |
| Silica: Snowtex N (Manufactured by Nissan Chemical Industries, Ltd.) | 80 |
| C.I. Pigment Red 5 | 2.6 |
| C.I. Pigment Orange 21115 | 5.3 |
| Anionic surface active agent | 1.0 |
| Water | 130 |
| Sublimatable color former: 3,7-bis-diethylamino-10-trichloroacetyl-phenoxazine | 8 |
| (2) Green Solution | |
| SBR resin binder | 100 |
| Silica | 80 |
| C.I. Pigment Green 36 | 5.4 |
| C.I. Vat Yellow 20 | 0.8 |
| β-copper phthaocyanine complex | 2.2 |
| Anionic surface active agent | 0.3 |
| Nonionic surface active agent | 0.46 |
| Water | 160 |
| Sublimatable color former: | 3 |

-continued

| | Part by weight |
|---|---|
| 4-(5-chloro-1,3,3-trimethyl-indolyno)methyl-7-(N—methyl-N—phenyl)amino-5'-chloro-1',3',3'-trimethyl-spiro[2H—1-benzopyran-(2H)—indole] | |
| (3) Blue-violet solution | |
| SBR resin binder | 100 |
| Silica | 80 |
| C.I. Pigment Blue 15 | 5.4 |
| Dioxazene Violet | 0.5 |
| Methyl Violet Lake | 0.5 |
| Anionic surface active agent | 0.3 |
| Sublimatable color former: N—(1,2-dimethyl-3-yl)methylydene-2,4-dimethoxy-aniline | 5 |
| Water | 160 |

The above-described three kinds of solutions were dispersed separately in ball mills for three hours in order to form the respective inks, which were sprayed and dried, thus obtaining red, green, and blue-violet spherical particles of 5 to 50 microns. With respect to 100 parts of the particles are 200 parts of cuprous iodide solution of the following formulation are separately fluidized, coated and thereafter classified to obtain 10 to 25 μm particles. The resistivity of the particles was about $10^3$ Ω.cm.

Formulation of copper iodide solution

| Cuprous iodide | 2 parts by weight |
|---|---|
| Acetonitrile | 100 |

A sensitized substrate of zinc oxide which had been panchromatized by the ordinary method was next charged to −400 V in a dark place by a corona electrifier which had been applied to −6 to −7 KV, and an equivalent mixture of the three kinds of light-transmissive particles was spread on the charged substrate. The transmissive particles were positively electrified as a result of electrostatic induction and were electrostatically adhered to the charged substrate. When a polyester film 75 μm thick was next adhered to the light-transmissive particles, and peeled after it was charged by a corona charger to which voltage of +6 to +7 KV had been applied, the particles which were laid one on top of another in a multiplicity of layers on the sensitized substrate was removed while being adhered to the polyester film, and only one layer of light-transmissive particles was left on the charged substrate. The covering rate of the light-transmissive particles with respect to the charged substrate at this time was about 70% and the electric potential of the light-transmissive particles was measured to be +80 V. A color copy was developed on the particle surface of the charged substrate. Thereafter, as is shown in FIG. 5, an alternative current of the amplitude of 7 KV was applied to the scrotron charger 5 having the grid electrodes 6, and the particle surface on the charged substrate was discharged. The potential of the light-transmissive particles at this time was measured to be lowered to 0 V. When vibration was added to the charged substrate from the back surface, it was possible to easily remove only those particles through which light was being transmitted, and a particle image having high color purity even at a portion where the color density was thick was obtained. After the entire surface of the charged substrate was exposed to white light and discharged, the clay layer of clay paper was brought close to the particle image, which was transferred onto the clay paper by applying +300 V voltage from the back surface of the clay paper. The transferred clay paper was heated to about 200° C., the sublimable color former was sublimated to develop on the clay layer, and the particles were removed by a cleaning brush, whereby a positive-positive color image of high purity was obtained from the color copy.

INDUSTRIAL APPLICABILITY

As has been described above, since a correlative force between the particles can be cancelled after exposure in an image forming method using light-transmissive particles according to the invention, a particle image of high color purity is obtained. Thus, the method according to the invention is applicable to a copying machine and a printer for obtaining a full color image through one-time exposure and one-time development.

What is claimed is:

1. An image forming method comprising the steps of:
   electrostatically adhering electroconductive light-transmissive particles onto the surface of a photoconductive substrate;
   exposing an image on said particles;
   making equipotential the particles through which light is transmitted and the particles through which no light is transmitted; and
   developing said image by separating a particle group consisting of said particles through which light is transmitted from a particle group consisting of said particles through which no light is transmitted in order to obtain a particle image consisting of one of said particle groups.

2. An image forming method according to claim 1, wherein said step of making said particles equipotential after exposure comprises the step of making the potential of said particles 0 V.

3. An image forming method according to claim 1, wherein said step of making said particles equipotential after exposure comprises the step of discharging the surfaces of said particles by a corona charger to which an alternative current is applied.

4. An image forming method according to claim 1, wherein said step of making said particles equipotential after exposure comprises the step of rubbing the surfaces of said particles with an earthed electroconductive brush.

5. An image forming method according to claim 1, wherein said light-transmissive particles have a spectrum function and a developing function for developing a color in correspondence with said spectrum function.

6. An image forming method according to claim 1, wherein said light-transmissive particles are a mixture of two or more particles containing a color material which transmits one color selected from the three primary colors of the additive color process and which develops the complementary additive color of said one color by utilizing a color selected from the three primary colors of the subtractive color process.

7. An image forming method comprising the steps of:
   electrostatically adhering onto the surface of a photoconductive substrate a mixture of two or more electroconductive light-transmissive particles containing a sublimable color former which transmits one color selected from the three primary colors of the additive color process and which develops the complementary additive color of said one color by utilizing a color selected from the three primary colors of the subtractive color process;

exposing an image on said particles;

making equipotential the particles through which light is transmitted and the particles through which no light is transmitted;

applying a force to said particles in order to remove the particles having between said particles and said substrate an electrostatic attractive force is under a predetermined value and obtained a particle image consisting of the remaining particles; and bringing an image receptor having a developer for developing said color former into close contact with said particle image and reacting said color former with said developer, thereby obtaining a developed image of said color former on said image receptor.

* * * * *